United States Patent
Goshen et al.

(10) Patent No.: US 8,938,110 B2
(45) Date of Patent: Jan. 20, 2015

(54) ENHANCED IMAGE DATA/DOSE REDUCTION

(75) Inventors: Liran Goshen, Pardes-Hanna (IL); Kevin M. Brown, Mentor on the Lake, OH (US); Stanislav Zabic, Highland Heights, OH (US); Jens Wiegert, Aachen (DE); Asher Gringauz, Nesher (IL)

(73) Assignee: Koninklijke Philips N.V., Eindhoven (NL)

( * ) Notice: Subject to any disclaimer, the term of this patent is extended or adjusted under 35 U.S.C. 154(b) by 343 days.

(21) Appl. No.: 13/508,751

(22) PCT Filed: Oct. 29, 2010

(86) PCT No.: PCT/IB2010/054913
§ 371 (c)(1),
(2), (4) Date: May 9, 2012

(87) PCT Pub. No.: WO2011/064683
PCT Pub. Date: Jun. 3, 2011

(65) Prior Publication Data
US 2012/0224760 A1    Sep. 6, 2012

Related U.S. Application Data

(60) Provisional application No. 61/286,477, filed on Dec. 15, 2009, provisional application No. 61/264,340, filed on Nov. 25, 2009.

(51) Int. Cl.
G06K 9/40 (2006.01)
G06T 5/40 (2006.01)
(Continued)

(52) U.S. Cl.
CPC .................. *G06T 5/002* (2013.01); *G06T 5/003* (2013.01); *G06T 2207/10081* (2013.01); *G06T 2207/30004* (2013.01); *G06T 2207/20012* (2013.01)

USPC ........... 382/131; 382/132; 382/168; 382/254; 382/275

(58) Field of Classification Search
CPC ..... G06T 5/002; G06T 7/0012; G06T 11/008; G06T 2207/10072; G06T 2207/10081; G06T 2207/20182; G06K 9/40; G06K 9/4642; H04N 1/409; A61B 5/0073; A61B 6/03; A61B 6/032; A61B 6/5258; A61B 6/5282; A61B 5/7203
USPC .......................... 382/131, 132, 168, 254, 275
See application file for complete search history.

(56) References Cited

U.S. PATENT DOCUMENTS 5,489,782 A * 2/1996 Wernikoff ...................... 250/369
5,768,440 A * 6/1998 Campanelli et al. .......... 382/261
(Continued)

FOREIGN PATENT DOCUMENTS

WO     2011048515 A2    4/2011

OTHER PUBLICATIONS

Kim, I-Gil. Image denoising using histogram-based noise estimation. MS thesis. University of Florida, 2008. Print.*
(Continued)

Primary Examiner — Michael A Newman (57) ABSTRACT

A method includes generating enhanced image data based on lower dose image data and a predetermined image quality threshold, wherein an image quality of the enhanced image data is substantially similar to an image quality of higher dose image data, and a system includes an image quality enhancer (128) that generates enhanced image data based on lower dose image data and a predetermined image quality threshold, wherein an image quality of the enhanced image data is substantially similar to an image quality of higher dose image data.

21 Claims, 9 Drawing Sheets (51) Int. Cl.
*H04N 1/409* (2006.01)
*G06T 5/00* (2006.01)

(56) References Cited

U.S. PATENT DOCUMENTS

| | | | |
|---|---|---|---|
| 6,493,416 B1 | 12/2002 | Hsieh | |
| 7,817,837 B2 | 10/2010 | Omi et al. | |
| 2003/0161518 A1* | 8/2003 | Vuylsteke | 382/128 |
| 2004/0066978 A1* | 4/2004 | Nanbu | 382/261 |
| 2007/0019851 A1* | 1/2007 | Nishide et al. | 382/131 |
| 2007/0053480 A1 | 3/2007 | Nishide et al. | |
| 2007/0147579 A1 | 6/2007 | De Man et al. | |
| 2007/0172104 A1* | 7/2007 | Nishide et al. | 382/131 |
| 2009/0097732 A1* | 4/2009 | Bohm et al. | 382/132 |
| 2011/0268328 A1* | 11/2011 | Bar-Aviv et al. | 382/128 |

OTHER PUBLICATIONS

Okumara, et al. "Effect of Edge-Preserving Adaptive Image Filter on Low-Contrast Detectability in CT Systems: Application of ROC Analysis." International Journal of Biomedical Imaging. 2008. (2008): 1-6. Print.*

Beaurepaire, et al., "Identification of the Nature of Noise and Estimation of Its Statistical Parameters by Analysis of Local Histograms." Acoustics, Speech, and Signal Processing, 1997. ICASSP-97., 1997 IEEE International Conference on 4 (1997): 2805-808. Print.*

Chang, et al., "Image Contrast Enhancement Based on a Histogram Transformation of Local Standard Deviation." IEEE Transactions on Medical Imaging 17.4 (1998): 518-31. Print.*

Black, M. J., et al.; Edges as Outliers: Anisotropic Smoothing Using Local Image Statistics; 1999; Scale-Space Theories in Computer Vision; pp. 259-270.

Fan, J., et al.; Local Maxium Likelihood Estimation and Inference; 1998; Journal of the Royal Statistical Society; Series B (Statistical Methodology); pp. 1-23.

Elad, M.; On the Origin of the Bilateral Filter and Ways to Improve It; 2002; IEEE Trans. on Image Processing; 11(10) 1141-1151.

Hou, Z., et al.; Image Denoising Using Robust Regression; 2004; IEEE Signal Processing Letters; 11(2)243-246.

Jiao, C., et al.; Multiscale Noise Reduction on Low-Dose CT Sinogram by Stationary Wavelet Transform; 2008; IEEE Nuclear Science Symposium Conference Record; pp. 5339-5344.

Kim, S. H., et al.; Optimal unsharp mask for image sharpening and noise removal; 2005; Journal of Electronic Imaging; 14(2)023005-1-023005-5.

Lee, J.; Digital Image Enhancement and Noise Filtering by Use of Local Statistics; 1980; IEEE Trans. on Pattern Analysis and Machine Intelligence; vol. PAMI-02(2)165-168.

Ramirez Giraldo, J. C., et al.; Comparative Study of Two Image Space Noise Reduction Methods for Computed Tomography; Bilateral Filter and Nonlocal Means; 2009; Engineering in Medicine and Biology Society; pp. 3529-3532.

Schilham, A. M. R., et al.; Local Noise Weighted Filtering for Emphysema Scoring of Low-Dose CT Images; 2006; IEEE Trans. on Medical Imaging; 25(4)451-463.

* cited by examiner

Fig. 11 ns. The detector array 118
ENHANCED IMAGE DATA/DOSE REDUCTION

CROSS REFERENCE TO RELATED APPLICATIONS

This application claims the benefit of U.S. provisional application Ser. No. 61/264,340 filed Nov. 25, 2009 and U.S. provisional application Ser. No. 61/286,477 filed Dec. 15, 2009, both of which is incorporated herein by reference.

The following generally relates to enhancing image data such as enhancing image quality (reducing noise) of lower dose image data to be substantially the same as the image quality of higher dose image data, and finds particular application to computed tomography (CT). However, it also amenable to other medical imaging applications and to non-medical imaging applications.

A multi-slice computed tomography (CT) scanner includes an x-ray tube mounted on a rotatable gantry that rotates around an examination region about a longitudinal or z-axis. The x-ray tube emits radiation that traverses the examination region and a subject or object therein. A two-dimensional detector array subtends an angular arc opposite the examination region from the x-ray tube. The detector array includes a plurality of rows of detectors that are aligned with respect to each other and that extend along the z-axis. The detectors detect radiation that traverses the examination region and the subject or object therein and generate projection data indicative thereof. A reconstructor processes the projection data and reconstructs three-dimensional (3D) volumetric image data indicative thereof. The volumetric image data is processed to generate one or more images of the examination region, including the portion of the subject or object disposed therein.

The literature indicates that an estimated 68.7 million CT procedures were performed in the U.S. in 2007. Unfortunately, CT scanners emit ionizing radiation and thus expose the patient to ionizing radiation. The radiation dose deposited in the patient depends on multiple factors, including, but not limited to, tube current (mAs), tube voltage (kVp), pitch/exposure time (for helical scans), slice thickness and spacing (for axial scans), the number of scans in a study, and patient build. The dose deposited in the patient can be reduced by decreasing tube current, tube voltage and/or the number of scans, and/or increasing the pitch, slice thickness and/or slice spacing. However, image noise is inversely proportional to radiation dose, and thus reducing radiation dose not only reduces the dose deposited in the patient but also increases image noise, which reduces image quality (e.g., image resolution), which may decrease the diagnostic value of the procedure.

Aspects of the present application address the above-referenced matters and others.

According to one aspect, a method includes generating enhanced image data based on lower dose image data and a predetermined image quality threshold, wherein an image quality of the enhanced image data is substantially similar to an image quality of higher dose image data.

According to another aspect, a system includes an image quality enhancer that generates enhanced image data based on lower dose image data and a predetermined image quality threshold, wherein an image quality of the enhanced image data is substantially similar to an image quality of higher dose image data.

According to another aspect, a method includes determining a noise standard deviation for the image data, a first set of outliers in the image data based on the noise standard deviation and a global algorithm, and a noise distribution based on a set of inliers, which are determined based on the first set of outliers.

According to another aspect, a method includes fitting one or more models to the image data, identifying a model of the one or more models as likely to remove noise from the image data while preserving structure representing a scanned object or subject in the image data, and employing the identified model to remove noise from the image data and generate noise reduced image data.

According to another aspect, a method includes obtaining lower dose image data, obtaining noise reduced image data, wherein the noise reduced image data is generated based on the lower does image data or projection data used to generated the lower dose image data, and generating enhanced image quality image data based on the lower dose image data and the noise reduced image data.

The invention may take form in various components and arrangements of components, and in various steps and arrangements of steps. The drawings are only for purposes of illustrating the preferred embodiments and are not to be construed as limiting the invention.

The following generally relates to enhancing or reducing noise in lower dose image data based on a predetermined image quality (noise) threshold so that the image quality of the enhanced lower dose image data is substantially similar to the image quality of higher dose image data. This allows for reducing patient dose while retaining image quality.

Figure 1:
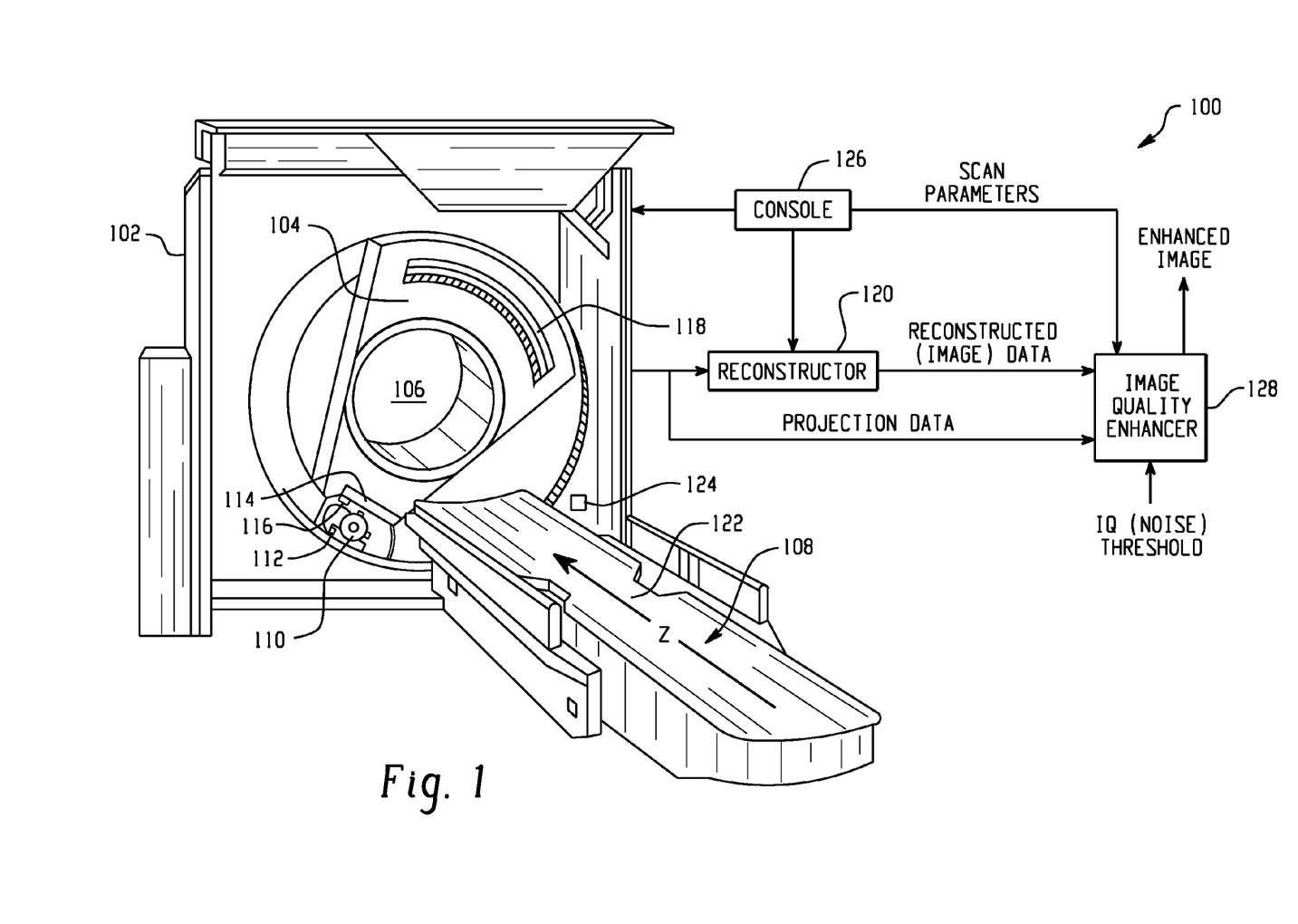
FIG. 1 illustrates an imaging system and an image quality enhancer.

FIG. 1 illustrates an imaging system 100 such as a computed tomography (CT) scanner. The imaging system 100 includes a generally stationary gantry 102 and a rotating gantry 104. The rotating gantry 104 is rotatably supported by the stationary gantry 102 and rotates around an examination region 106 about a longitudinal or z-axis 108.

A radiation source 110, such as an x-ray tube, is supported by the rotating gantry 104. The radiation source 110 emits radiation from a focal spot and the radiation traverses the examination region 106. A source controller 112 controls the source 110, including source current and/or voltage.

A source collimator 114 includes collimation members that collimate the radiation to form a generally cone, wedge, fan or other shaped radiation beam. A collimator controller 116 controls the source collimator 114, including the relative position of the members, which facilitates defining x and/or z-axis radiation beam width.

A two-dimensional radiation sensitive detector array 118 subtends an angular arc opposite the radiation source 110 across the examination region 106. The detector array 118 includes a plurality of rows of detectors that extend along the z-axis 108 direction. The detector array 118 detects radiation traversing the examination region 106 and generates projection data indicative thereof.

A reconstructor 120 reconstructs the projection data and generates three-dimensional (3D) volumetric image data indicative thereof. The reconstructor 120 may employ a conventional 3D filtered-backprojection reconstruction, a cone beam algorithm, an iterative algorithm and/or other algorithm.

A patient support 122, such as a couch, supports an object or subject such as a human patient in the examination region 106. A patient support controller 124 controls the patient support 122, including a speed at which the patient support 122 moves through examination region 106 during scanning.

A general-purpose computing system or computer serves as an operator console 126. A processor of the console 126 executes computer readable instructions on the console 126, which allows an operator to control operation of the system 100 such as selecting a low dose scan protocol, setting scan parameters such as source current, source voltage, beam width, pitch, slice thickness, type of scan (e.g., axial or helical/spiral) and, number of scans, initiating scanning, etc.

The system 100 can be used for performing full dose scans and lower or reduced dose scans.

An image quality enhancer 128 enhances image data generated by the imaging system 100 (or other imaging system) such as image data from a lower dose scan. In one embodiment, the image data is enhanced based on a predetermined image quality threshold such as an image noise threshold. As described in greater detail below, this may include determining a noise standard deviation for the image data or a noise variance distribution from the projection data used to generate the image data, and generating enhanced image data based on the initial lower dose image data and noise reduced image data generated with the noise standard deviation or noise variance distribution.

As a result, the image enhancer 128 can be used to enhance the image quality of image data for a lower dose scan to a level that is about the same or substantially similar to the image quality in an equivalent higher dose or full dose scan. Hence, patient dose can be reduced while retaining a predetermined level of image quality and preserving the underlying structure of the scanned object. The image enhancer 128 can further be configured to enhance particular structure of interest (e.g., edges) and/or generate data that is substantially invariant to one or more of the acquisition parameters (e.g., slice thickness).

In the illustrated embodiment, the image enhancer 128 is part of the system 100, but separate from the console 126. In another embodiment, the image enhancer 128 is part of the console 126. In yet another embodiment, image enhancer 128 is located remote from the system 100, for example, in a computing system such as a workstation outside of the exam room in which the system 100 is located. The image enhancer 128 also includes one or more processors that execute one or more computer readable and executable instructions stored or encoded in computer readable storage medium of the enhancer 128 or other component to perform the functionality discussed herein.

Figure 2:
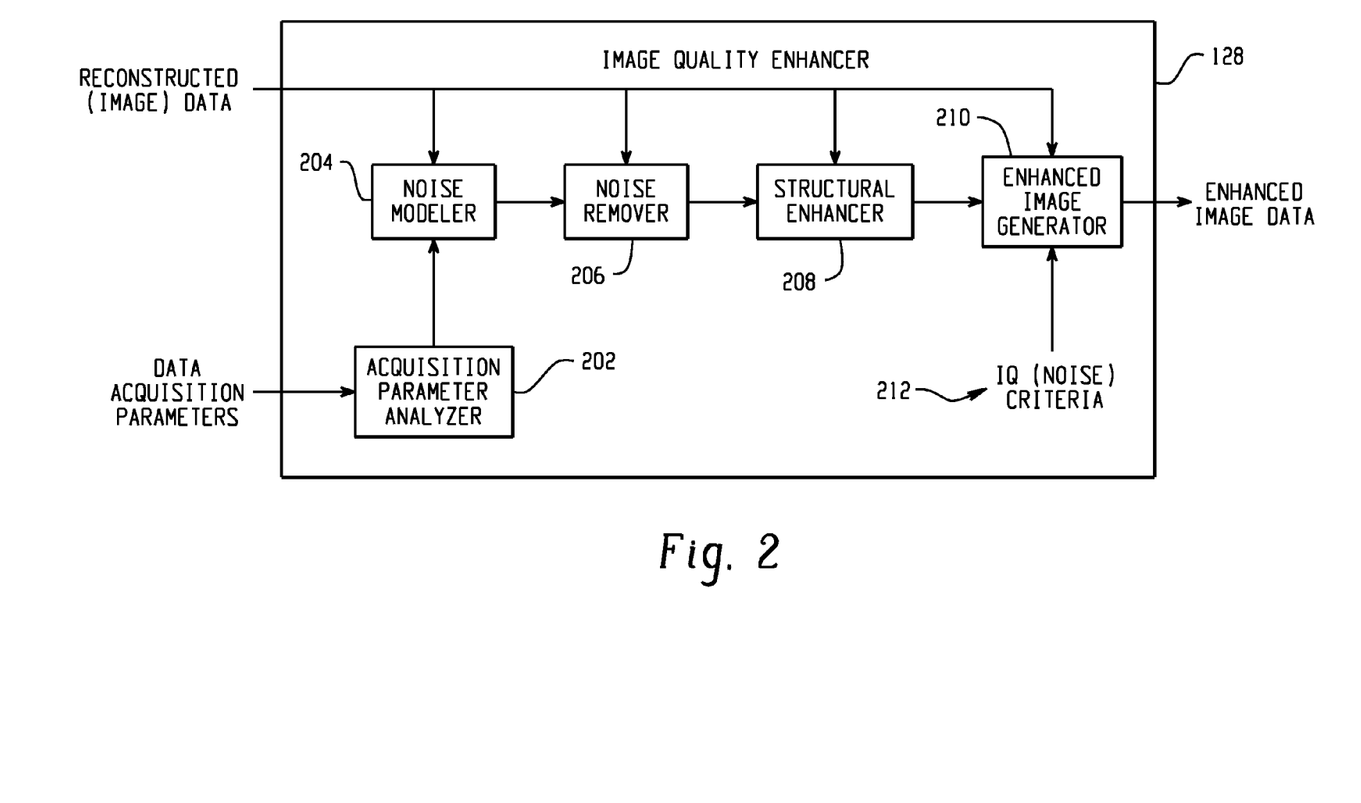
FIG. 2 illustrates an example of the image quality enhancer that generates enhanced image data based on image data.

FIG. 2 illustrates an example of the image quality enhancer 128. In this example, the image enhancer 128 is configured to enhance image data based on a noise distribution determined from reconstructed (image) data.

The image enhancer 128 includes an acquisition parameter analyzer 202 that analyzes one or more of the data acquisition (scan) parameters used to scan an object or subject and generate the image data. It is to be appreciated that the acquisition parameters can be obtained from the console 126, memory, and/or other component, and/or manually entered by a user.

The acquisition parameter analyzer 202 automatically determines information from the data acquisition parameters, and the information can be taken into account when generating the enhanced image data. By way of example, the acquisition parameter analyzer 202 can automatically identify information from the data acquisition parameters related slice thickness, and this information can be used to generate enhanced image data that is substantially invariant to the acquisition slice thickness.

The information can be taken into account when determining the spatial kernel weights defined below (e.g., in Equation 2) and used for noise removal and includes, but is not limited to, a minimum number of spatial weights and a central spatial weight for filtering kernel. These two parameters may facilitate balancing a relative influence of neighboring voxels in the noise removal kernel while keeping the size and strength of the spatial component of the filtering kernel invariant to the study slice thickness. This balance leads to results that are close to being invariant to the acquisition slice thickness. Once the spatial weighting kernel is set, slice thickness related algorithm parameters are derived from it.

It is to be understood that other information can additionally or alternatively be obtained from the data acquisition parameters and used to produce the enhanced image data. Moreover, in another embodiment, the acquisition parameter analyzer 202 is omitted. In such an embodiment, the particular information is otherwise determined and conveyed to the image quality enhancer 128 or is not used in determining the enhanced image data.

The image enhancer 128 further includes a noise modeler 204 that models or calculates a noise distribution based on the image data. An example of such a noise modeler is illustrated in FIG. 3.

Figure 3:
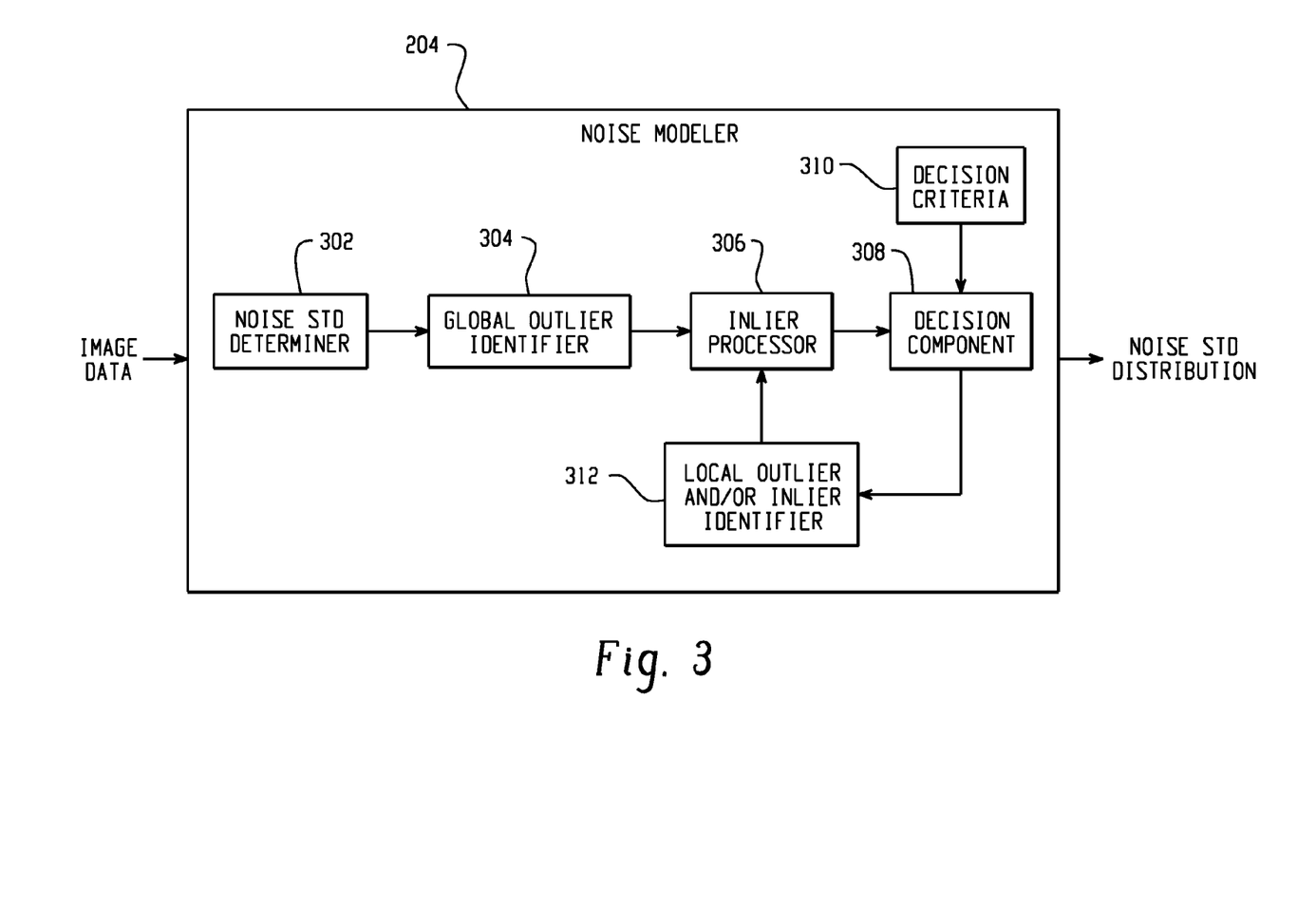
FIG. 3 illustrates a noise modeler of the image quality enhancer.

As shown in FIG. 3, the noise modeler 204 includes a noise standard deviation (STD) determiner 302 that determines a noise standard deviation for sub-portions of voxels in the image data. Generally, the standard deviation of a sub-portion of voxels behaves as a random variable with a mixture density distribution, as the sub-portions vary across the image volume. These sub-portions include outliers (edges) corresponding to non-homogeneous regions and sub-portions that include inliers (non-edges) corresponding to homogenous regions.

A global outlier identifier 304 identifies outliers in the image data based on a global algorithm and the noise standard deviation. In one non-limiting instance, this includes segmenting the scanned object or subject from the rest of the image data. The segmentation can be achieved through thresholding followed by a region growing technique or other technique. Segmenting the data may facilitate reducing the number of voxels that will subsequently be processed and thus reduce processing time.

The global outlier identifier 304 then analyzes the segmented data. In one instance, the global analysis includes using a histogram of the local STD of small regions of the scanned object or subject in which the histogram represents the distribution of the local STD in the image data. The local STD on suspected outliers can be identified using this histogram, for example, as the signal values past a fixed percentage of the distribution or otherwise.

An inlier processor 306 processes the inliers (determined from the outliers) and generates the noise STD distribution for the image data. In the illustrated embodiment, the inlier processor 306 processes the inliers based on a smoothing algorithm such as a wide two-dimensional (2D) median filter algorithm, which is applied over local STD image data. In the illustrated embodiment, values in a resulting STD matrix that are designated as outliers are ignored, and any remaining outliers in the new noise level estimate are filled using interpolation (e.g., linear, spline, etc.).

In an alternative embodiment, the wide median is approximated using a multi resolution technique. Using an approximation may facilitate decreasing processing time. In another alternative embodiment, the outlier local STD values are replaced with a repeated pattern that includes the two extreme values of the local STD distribution, and the pattern is synchronized with the multi resolution calculations. This replacement allows fast calculation of a conventional median on regions in an image for each separate resolution. The specific replacement pattern can be selected so that the approximated result is very close to the result of a regular median calculation.

A decision component 308 determines whether to refine the noise STD distribution. In the illustrated embodiment, this decision is based at least in part on predetermined decision criteria 310, which can be stored in local or remote memory. In one instance, the criteria includes a maximum number of iterations. Additionally or alternatively, the criteria is based on a difference between the results of two iterations and a predetermined difference range, wherein a subsequent iteration is not performed if the difference is within the predetermined difference range. Additionally or alternatively, the criteria is based on a predetermined time period, wherein a subsequent iteration is not performed after the time period lapses.

For instances in which the noise STD distribution is to be refined, a local outlier and/or inlier identifier 312 identifies a set of outliers from the inliers based on a local algorithm. In one instance, this includes adjusting the set of outliers based on a comparison between a local standard deviation of the original image data and the new noise level estimate. This can be achieved by identifying a local standard deviation in the original image as an outlier only if its value is significantly higher than its corresponding local noise level estimate. Then a new estimate is determined for the local noise level as discussed above.

The noise modeler 204 outputs a signal indicative of the noise STD distribution.

The image quality enhancer 128 further includes a noise remover 206 that removes noise from the image data based on the noise STD distribution. An example of a noise remover 206 is illustrated in FIG. 4.

Figure 4:
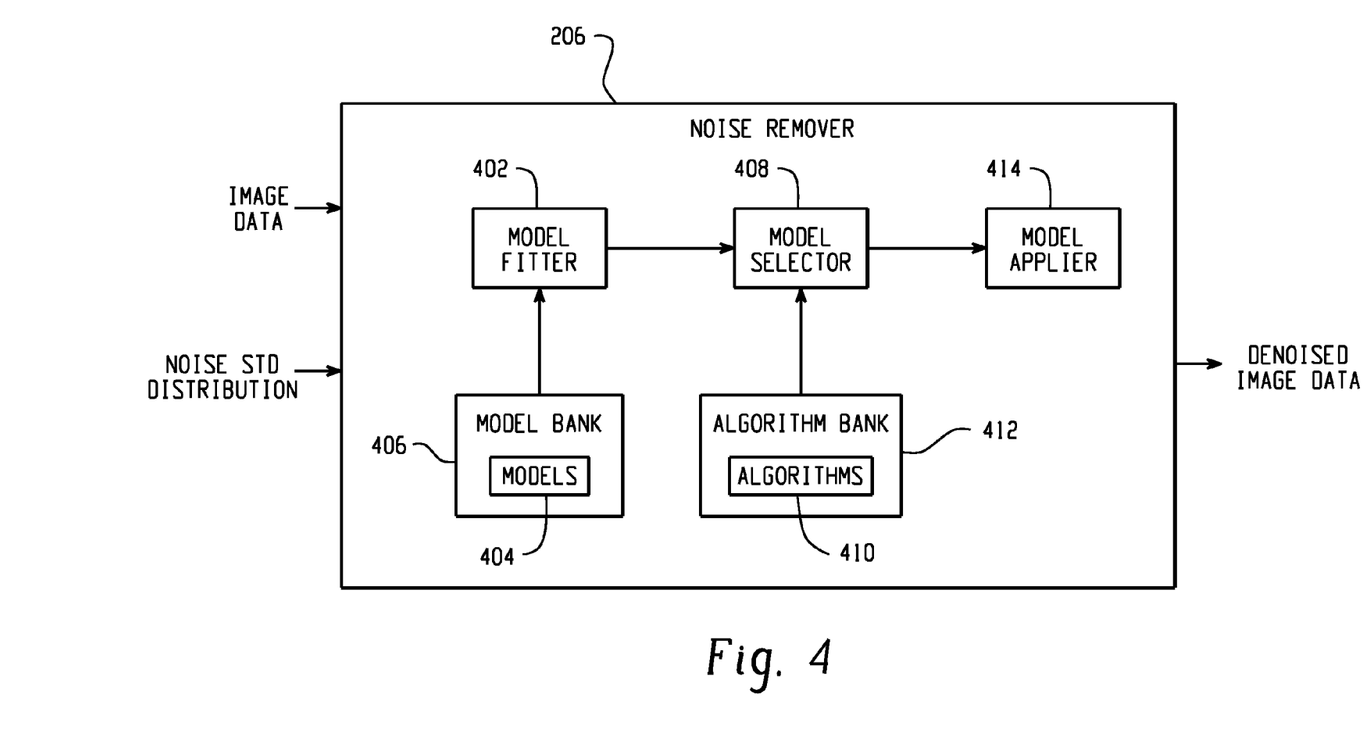
FIG. 4 illustrates a noise remover of the image quality enhancer.

As shown in FIG. 4, the noise remover 206 includes a model fitter 402 that fits various local structural models 404 from a model bank 406 to the image data. In one embodiment, this includes fitting one or more local structure models to each voxel and its three-dimensional (3D) neighborhood.

The noise remover 206 also includes a model selector 408 that selects a model from the fitted models that is likely to remove noise from the image data while preserving the structure representing the scanned object or subject in the image data. The illustrated model selector 408 selects a model based on one or more algorithms 410 such a statistical learning or other machine learning algorithm in an algorithm bank 412.

The noise remover 206 also includes a model applier 414 that applies the selected model to the image data to remove noise. A new estimated value of the voxel is determined from a corresponding model value. The output of the model applier 414 is denoised image data.

The following describes a non-limiting example of fitting models, selecting a model, and applying the selected model. For this example, given a 3D image volume V of voxels with indices i, j and k, a noiseless structure M that has the smallest weighted Euclidian distance from the sub-volume $V_{i+i',j+j',k+k'}$ of the noisy image V can be found based on Equation 1:

$$\hat{p} = \operatorname*{argmin}_{p} \sum_{i'=-n}^{n} \sum_{j'=-n}^{n} \sum_{k'=-n}^{n} (V_{i+i',j+j',k+k'} - M_{i',j',k'}(p))^2 w_{i',j',k'}^2, \quad \text{Equation 1}$$

wherein for a positive integer n, indices i', j' and k' take values from −n to n, p represents a free parameter vector, $M_{i',j',k'}(p)$ represents a model value for the (i+i',j+j',k+k') voxel in the volume, $w_{i',j',k'}$ represent weight factors and $\hat{p}$ represents the optimal value of the free parameter.

The weight factors can be determined based on Equation 2:

$$w_{i',j',k'} = w^{spatial}_{i',j',k'} w^{HU}_{i',j',k'}, \quad \text{Equation 2:}$$

wherein $w^{spatial}_{i',j',k'}$ represents weights for neighboring voxels according to their spatial distance to $V_{i,j,k}$, and $w^{HU}_{i',j',k'}$ represents weights for neighboring voxels according to their value-distance to $V_{i,j,k}$ in the HU (Hounsfield Unit) space.

$w^{spatial}_{i',j',k'}$ can be determined based on Equation 3:

$$w^{spatial}_{i',j',k'} = \sqrt{\exp\left(-\frac{((i'dx)^2 + (j'dx)^2 + (k'dz)^2)}{2\sigma_{spatial}^2}\right)}, \quad \text{Equation 3}$$

wherein dx is the size of the pixel (e.g., in millimeters, or mm), dz is the slice width (e.g., in mm), and $\sigma_{spatial}$ is an algorithm parameter that controls the aggressiveness of the weights.

$w^{HU}_{i',j',k'}$ can be determined based on Equation 4:

$$w^{HU}_{i',j',k'} = \sqrt{\exp\left(-\frac{(V_{i,j,k} - V_{i+i',j+j',k+k'})^2}{2(\hat{n}_{i,j,k} mult)^2}\right)}, \quad \text{Equation 4}$$

wherein $\hat{n}_{i,j,k}$ is the local noise level estimate of voxel $V_{i,j,k}$ and mult is an algorithm parameter that control the aggressiveness of the weights. The specific localization weighting directs the fitted models to preserve the local structure of the volume.

For explanatory purposes, assume that the model bank 406 includes two models 404, a constant model $M_{i',j',k'}(c) = c$ and a second order polynomial model $$M_{i',j',k'}(a, b, c, d) = a\frac{i'^2}{n^2} + b\frac{j'^2}{n^2} + c\frac{k'^2}{n^2} + d.$$

Of course, other models are contemplated herein.

For the constant model, the model fit coincides with a weighted averaging as a function of shown in Equation 5:

$$\hat{V}^1_{i,j,k} = \frac{\sum_{i'=-n}^{n} \sum_{j'=-n}^{n} \sum_{k'=-n}^{n} V_{i+i',j+j',k+k'} w^2_{i',j',k'}}{\sum_{i'=-n}^{n} \sum_{j'=-n}^{n} \sum_{k'=-n}^{n} w^2_{i',j',k'}}, \quad \text{Equation 5}$$

wherein $\hat{V}^1_{i,j,k}$ represents the new noiseless estimate for voxel $V_{i,j,k}$. Equation 5 can be obtained using a standard minimizing technique, for example, by finding the zero of the first derivative on a cost function.

For the second order polynomial model, the model fit coincides with the least squares solution $\vec{x}=(d,a,b,c)$ of the overdetermined system of linear equations as represented in Equation 6:

$$A\vec{x} = \vec{b}, \qquad \text{Equation 6:}$$

wherein the matrix A is a $(2n+1)^3 \times 4$ matrix with rows $$\left[ 1 \quad \left(\frac{i'}{n}\right)^2 \quad \left(\frac{j'}{n}\right)^2 \quad \left(\frac{k'}{n}\right)^2 \right] w_{i',j',k'},$$

for a fixed integer triple (i',j',k'), and the vector b is a vector of length 2n+1 with corresponding entries $V_{i+i',j+j',k+k'} w_{i',j',k'}$ for each fixed integer triple (i',j',k'). The least squares solution of Equation 6 can be found based on Equation 7:

$$\vec{x} = (A^T A)^{-1} A^T \vec{b}. \qquad \text{Equation 7:}$$

The inverse of matrix $A^T A$ can be found using various matrix inversion algorithms.

For explanatory purposes, assume that the matrix $A^T A$ has a full rank in order. Also assume that the first component of the vector $\vec{x}$ (value d) is the component of interest since only the central pixel of the n-neighborhood is being updated and the estimated noiseless value of the voxel $V_{i,j,k}$ is $\hat{V}^2_{i,j,k} = M_{0,0,0}(\vec{x}) = d$.

Under the above assumptions, the noiseless estimate can be determined based on Equation 8:

$$\hat{V}^2_{i,j,k} = \frac{[C_{11} \quad C_{21} \quad C_{31} \quad C_{41}] \cdot A'b}{|A'A|}, \qquad \text{Equation 8}$$

wherein $C_{ij}$ is the (i,j) cofactor of matrix A'A and $[C_{11} \, C_{21} \, C_{31} \, C_{41}]$ is a 1×4 matrix consist of four cofactors.

In one instance, one of the above two models, such as the simplest of the two models, is fitted to the image data first. In this example, the constant model is fitted first. A metric is then determined for the fitted model. An example of a suitable metric is described in Equation 9:

$$\frac{\text{local STD in }(i,j,k)\text{ over }\hat{V}^1}{\text{local STD in }(i,j,k)\text{ over }V}, \qquad \text{Equation 9}$$

wherein $\hat{V}^1$ is the resulting noiseless estimated volume of the first model and V is the original unprocessed volume.

The metric is compared against a predetermined threshold TH, for example, as shown in inequality of Equation 10:

$$\frac{\text{local STD in }(i,j,k)\text{ over }\hat{V}^1}{\text{local STD in }(i,j,k)\text{ over }V} > TH. \qquad \text{Equation 10}$$

The threshold TH can be estimated using a Monte Carlo technique, for example, over a synthetic homogeneous noisy study. The default value for threshold TH can be variously set, for example, based on a statistical significance greater than 50%, like 60%, 80%, 90%, 95%, 99% or other statistical significance.

If the metric satisfies the threshold, then the polynomial model is selected and applied. Otherwise, the constant model is selected and applied. Note that Equation 10 captures the effectiveness of the first model (the constant model in this example). In general, if the first model is not effective enough, then the second model is employed.

Optionally, the above method can be applied iteratively. With an iterative approach, the result of one iteration is used as an input for a subsequent iteration. The subsequent iteration may further reduce noise.

The image quality enhancer 128 optionally includes a structural component enhancer 208. In one instance, the structural component enhancer 208 provides adaptive structural component image enhancement. In one embodiment, the structural component enhancer 208 adaptively sharpens the image data by incorporating the noise level estimate with a soft thresholding technique to target predetermined aesthetical image sharpness.

The sharpening can be achieved using a Laplacian or other approach. With a Laplacian approach, a level of sharpening can be determined adaptively as a function of a local Laplacian, local noise level, and various input parameters. The parameters can be used to control an amount of aggressiveness and adaptation of the sharpening.

The image quality enhancer 128 further includes an enhanced image generator 210. The illustrated enhanced image generator 210 generates an enhanced image based on the image data and the noise reduced image data. In one instance, the enhanced image generator 210 generates the enhanced image data by combining the image data and the noise reduced image data on a voxel-by-voxel basis. The data can be combined based on a linear or non-linear mixing algorithm.

In the illustrated embodiment, the data is combined based on predetermined IQ (noise) criteria 212. The IQ criteria 212 are adjustable (e.g., can be set and changed based on user input), which allows for controlling the noise level in the enhanced image data, which is directly related to the dose of the acquisition. As such, the user can set a noise level and generate enhanced image data, and then repeat this for one or more other noise levels. In one instance, the IQ criteria 212 is set to allow for preserving the noise power spectrum.

The following describes one non-limiting approach for determining a ratio mixing of the image data and the noise reduced image data. The algorithm takes standard deviation signals of the original and the filtered image and forms another signal, the ratio of these two signals. The mix ratio is found as a median of that ratio after the outliers are thrown away.

Where $I^{std}$ is the local standard deviation of the original image and $I^{std2}$ is the local standard deviation of the denoised image, both determined using the disk radius r≥1, their ratio can be calculated for every pair of pixel indices (i, j) in the image, based on Equation 11:

$$S(i,j) = \frac{I^{std2}(i,j)}{I^{std}(i,j)}, \qquad \text{Equation 11}$$

(or $$S = \frac{I^{std2}}{I^{std}},$$

where the division is on an element by element basis). The first layer of outliers comes from the matrix $O_1$, which is defined as a dilated version of matrix $B^{classifier}$ using the dilate radius $d \geq 1$, where $B^{classifier}$ is a Boolean matrix derived from the condition in the equation 10:

$$B^{classifier}(i,j) = \begin{cases} \text{'true'} & \text{if } S(i,j) > TH, \\ \text{'false'} & \text{otherwise.} \end{cases}$$

Other outliers in matrix S are identified as those that are greater than one. But instead of throwing those away, only their decimal part is chosen, as shown in Equation 12:

$$S_1 = \{\text{mod}(S(i,j), 1) | \text{ for all } (i,j) \text{ such that } O_1(i,j) = \text{'false'}\}, \quad \text{Equation 12:}$$

which can be written as $S_1 = \text{mod}(S(\sim O_1), 1)$ in pseudo code notation. The estimate factor f can be determined as the median of the signal $S_1$ or as the mode of the signal $S_1$.

Given a targeted noise reduction T, the first mix ratio estimate is then determined from the requirement that the noise variance of the processed image is equal to the variance of the original image multiplied by 1−T based on in Equation 13:

$$p_1 = 1 - \frac{1 - \sqrt{1-T}}{1-f}. \quad \text{Equation 13}$$

In a next step, the mix ratio $p_1$ is corrected by the multiplier k and bias b based on Equation 14:

$$p_2 = k*p_1 + b.$$

Then, the mix ratio p is determined from the requirement that it must be within a predetermined range $0 \leq m_1 < m_2 \leq 1$, for example, based on the formula in Equation 15:

$$p = \begin{cases} m_1, & \text{if } p_2 > m_1, \\ m_2, & \text{if } p_2 < m_2, \\ p_2, & \text{otherwise.} \end{cases} \quad \text{Equation 15}$$

As discussed above, the image quality enhancer 128 as described herein can be used to enhance lower dose image data so that the image quality of the lower dose image data is the same or substantially similar to the image quality of full dose image data.

Figure 5:
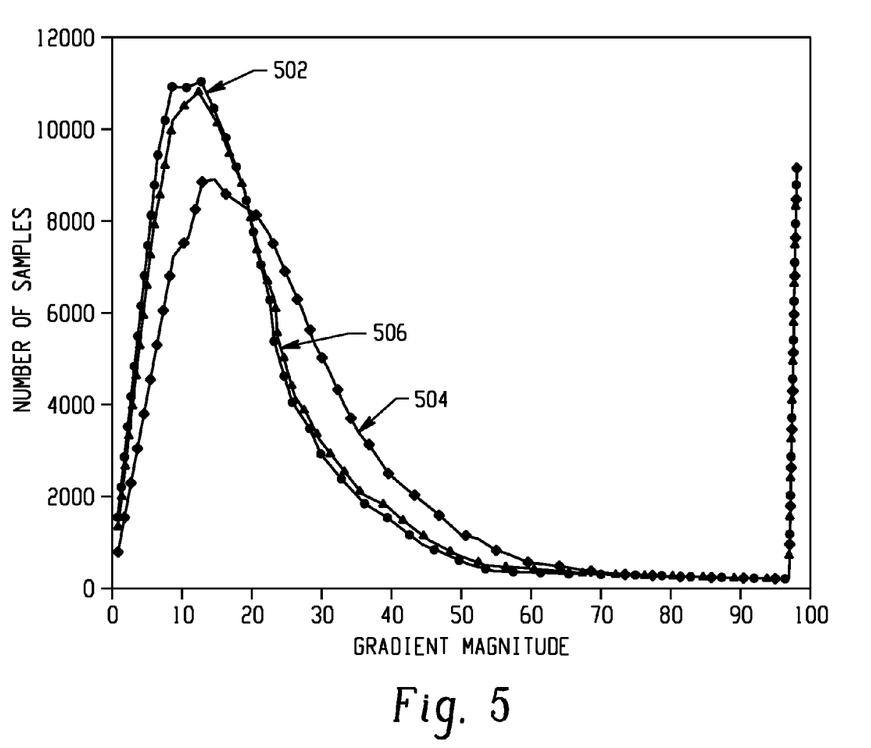
FIG. 5 graphically illustrates gradient magnitude curves for full dose, reduced dose, and reduced dose with enhancement scans.

This is graphically illustrated in FIG. 5, which shows gradient magnitude distribution 502, 504, and 506 respectively for a full (100%) dose scan, a 50% dose scan, and a 50% dose scan with image enhancement. The magnitude distribution is proportional to image quality. As shown, the gradient distribution 506 for the 50% dose scan with image enhancement is substantially similar to the gradient distribution 502 for the full (100%) dose scan.

Variations are contemplated.

In FIG. 2, the noise modeler 204 generates a noise STD distribution, based on image data, that is used to generate the enhanced image data. In an alternative embodiment (FIG. 6), the noise modeler 204 generates a noise variance distribution, based on projection data, that is used in determining the enhanced image data.

Figure 6:
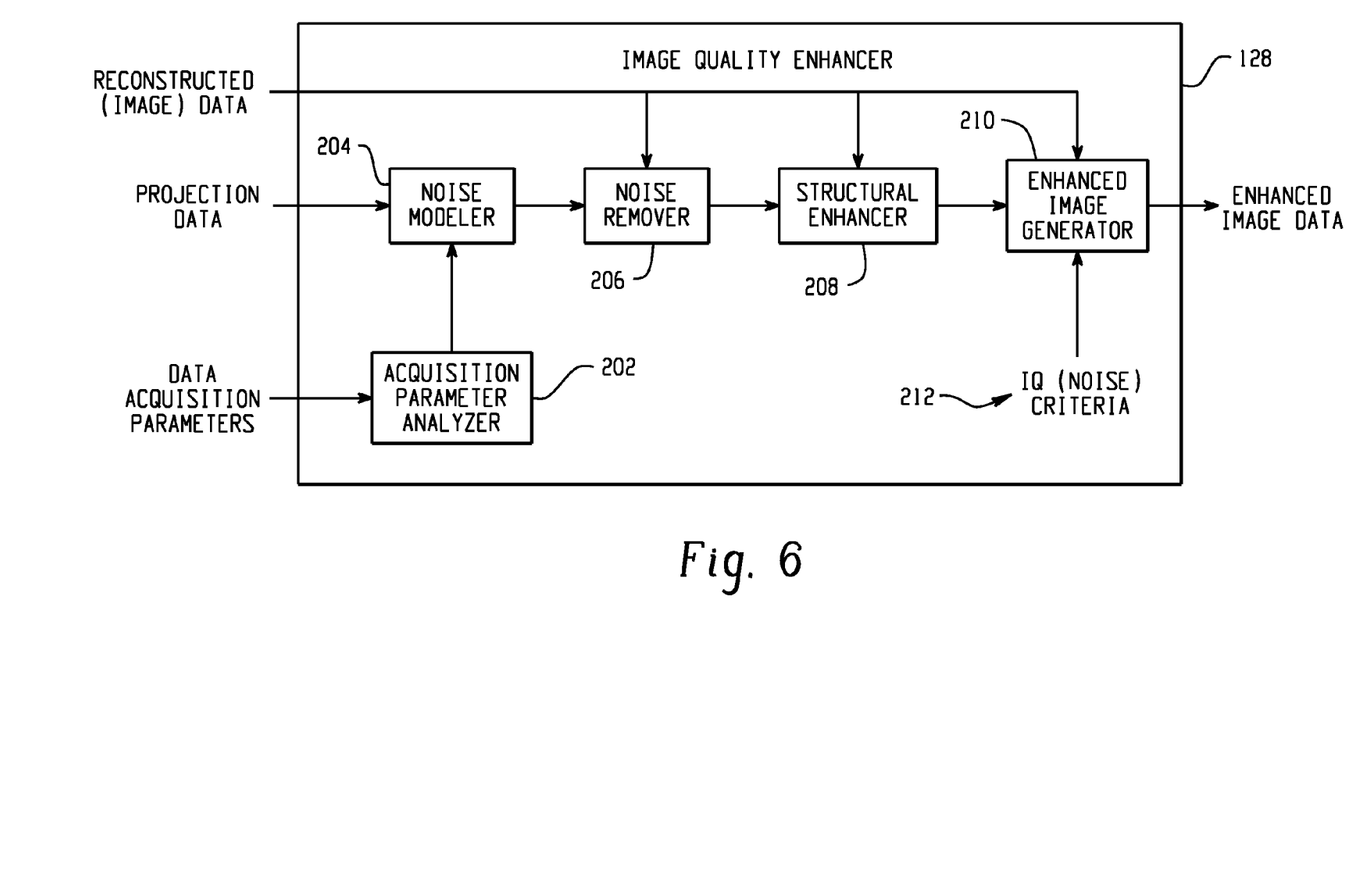
FIG. 6 illustrates an example of the image quality enhancer that generates enhanced image data based on projection data.

With this example, the noise modeler 204 processes the line integral measurements in the projection data and generates a noise variance distribution for the projection data. In one instance, this can be implemented as follows. First, a variance sinogram is generated from the projection data. For this purpose, for each line integral value (or each sample in the sinogram), the variance of the measurement is computed as a function of Equation 16:

$$\frac{1}{(N0) \cdot e^{(-P)}}; \quad \text{Equation 16}$$

where N0 is the number of input photons to the patient along the current ray and P is the line integral of the attenuation along the current ray.

Equation 16 takes into account the Poisson nature of the photon-emissions. In other embodiments, Equation 16 can be extended to also take into account noise from scatter, beam hardening, electronic noise, and/or other effects. An example of a model that also takes into account other effects include the model described in "Scattered radiation in cone-beam computed tomography: analysis, quantification and compensation," Jens Wiegert, PhD Thesis, 2007.

In an alternative embodiment, a new sinogram, which can be generated by forward-projecting through the volume of reconstructed image images in 2D or 3D, is used instead of the original projection data. As such, the noise variance distribution can be generated even when the original projection data is not available or readably accessible.

The noise modeler 204 processes the noise variance distribution and generates noise variance image data. The noise modeler 204 can employ a reconstruction algorithm similar to an algorithm employed by the reconstructor 120 of FIG. 1 or a different reconstruction algorithm that can determine a noise variance for each voxel or a selected subportion of the voxels in the image data generated by the reconstructor 120.

By way of example, in one instance the noise modeler 204 reconstructs the data in a manner identical or nearly identical to a conventional filtered backprojection reconstruction, requiring two convolution operations (instead of only one), and a modified view-weighting function in the case of 3D backprojection.

In instances in which the projections are interpolated in the angular and radial directions (angular and radial rebinning), the interpolation may impact the noise in the reconstructed image data. The above algorithm is also compatible with methods that incorporate the effect of the angular and radial rebinning, for example, a multiplication of the variance sinogram data by a factor that varies spatially across the detectors.

It is to be appreciated that the above discussed noise variance image data can also be used with other applications. By way of example, the noise variance image data can be used with an image-denoising algorithm to facilitate noise removal.

In one instance, the square root of this noise variance image can be used in the noise removal step 206 instead of the result of the noise modeler 204 (see FIG. 2).

In other instance, this includes applications employing the Rudin/Osher/Fatemi noise reduction algorithm. For example, given a noisy image f(x, y), its domain $\Omega$ and scalar $\lambda$, this algorithm can be used to obtain the noiseless image u(x, y) as the minimizer of the cost function:

$$(\min) \int_\Omega |\nabla u| dx dy + \frac{\lambda}{2} \int_\Omega (f-u)^2 dx dy.$$

With this cost function, the image noise variance can be used to vary the strength of the λ parameter, proportionally to 1/v, where v is the estimated image variance (per voxel).

In other embodiments, other algorithms are used to perform the image-de-noising operation, for example, other algorithms that reduce image noise while preserving strong gradients of real structures and incorporate the noise variance data into the de-noising process. By way of another example, the noise variance image data can be used with applications for optimizing noise, such as optimizing noise in view of dose. Such an application is described in patent application Ser. No. 61/253,881, filed Oct. 22, 2009, and entitled "Acquisition Protocol Assessment Apparatus," which is incorporated in its entirety herein by reference.

FIGS. 7-11 describe various methods. It is to be appreciated that the ordering of the acts is non-limiting and one or more of the acts may occur in a different order. In addition, one or more of the acts may be omitted and/or one or more acts may be added.

Figure 7:
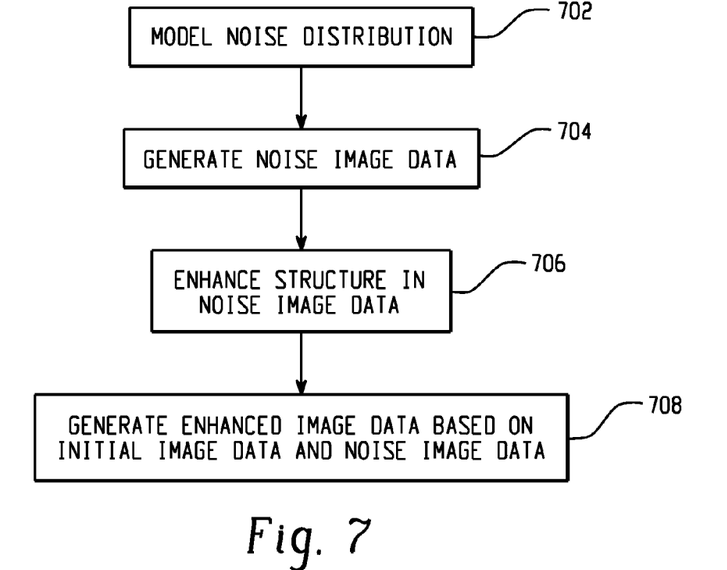
FIGS. 7-11 illustrate various methods.

FIG. 7 illustrates a method for enhancing image data. As discussed herein, this includes enhancing low dose image data so that the image quality of the low dose image data is the same or substantially similar to the image quality of full dose image data.

At 702, a noise distribution is modeled. In one instance, the noise distribution is a noise STD distribution generated based image data. In another instance, the noise distribution is a noise variance distribution generated based projection data.

At 704, noise reduced image data is generated by removing noise from the image data based on noise STD distribution or the noise variance distribution.

At 706, the structure in the noise reduced image data is enhanced. In another embodiment, act 706 is omitted.

At 708, enhance image data is generated based on the initial image data and the noise reduced image data, for example, by combining the initial image data and the noise reduced image data based on an image quality threshold as described herein.

Figure 8:
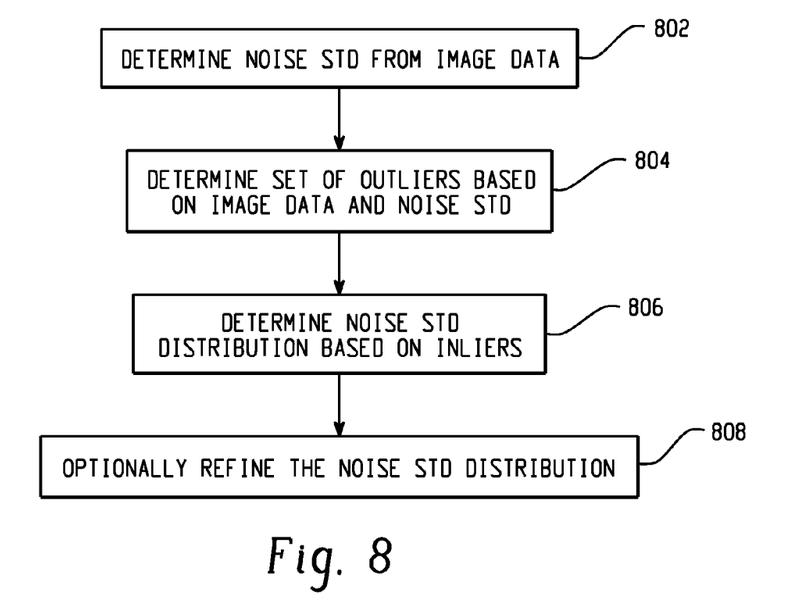

FIG. 8 illustrates a method for modeling noise in image data.

At 802, a noise standard deviation is determined for the image data.

At 804, a first set of outliers are identified in the image data based on the noise standard deviation and a global algorithm.

At 806, noise reduced image data is determined based on a set of inliers, which are determined based on the first set of outliers. As discussed above, this may be achieved by applying a smoothing filter over the inliers.

If it is determined that the noise images data should be refined, then at 808 a subsequent set of outliers is identified based on the set of inliers and a refined noise reduced image data is determined based on a subsequent set of inliers, which are determined based on the subsequent set of outliers.

Figure 9:
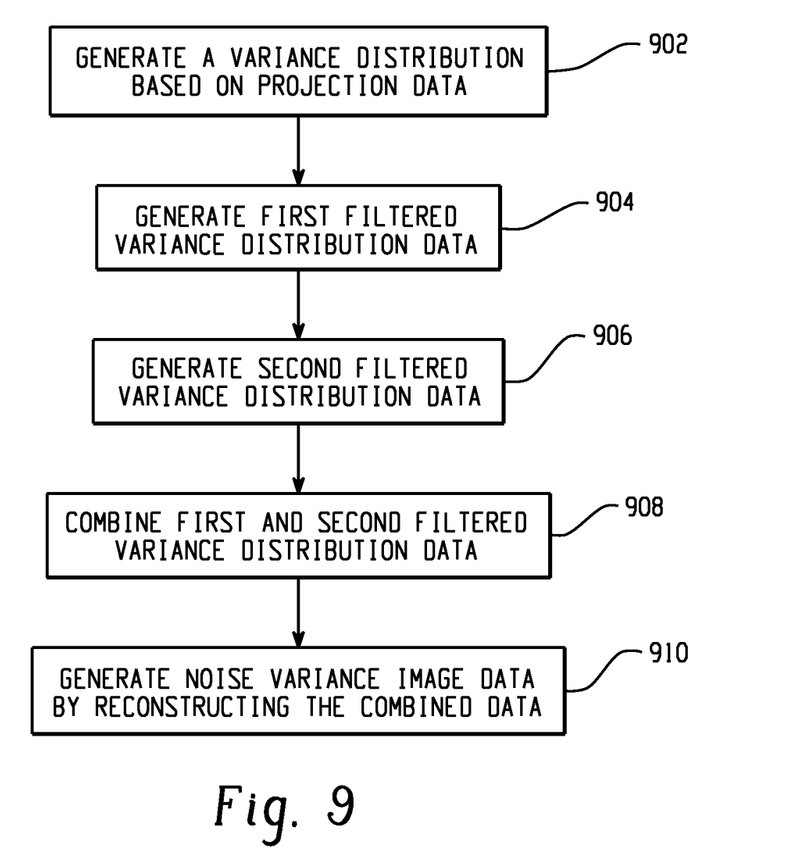

FIG. 9 illustrates a method for modeling noise in projection data.

At 902, a variance distribution is generated based on the projection data.

At 904, first filtered variance image data is generated by filtering the variance distribution using a first filter. An example first filter is a ramp squared filter.

At 906, second filtered variance image data is generated by filtering the variance distribution using a second filter. An example second filter is a shifted ramp filter.

At 908, the first and second filtered variance data is combined. In one non-limiting example, the data is combined using a stretch-combine algorithm such as the following: $v(r,z)=w^2 v(r,s_0)+(1-w)^2 v(r,s_0+1)+2w(1-w)v(r,s_0)$.

At 910, noise variance image data is generated by back-projecting the combined data. This can be done using squared wedge or other weights, or no weights.

Figure 10:
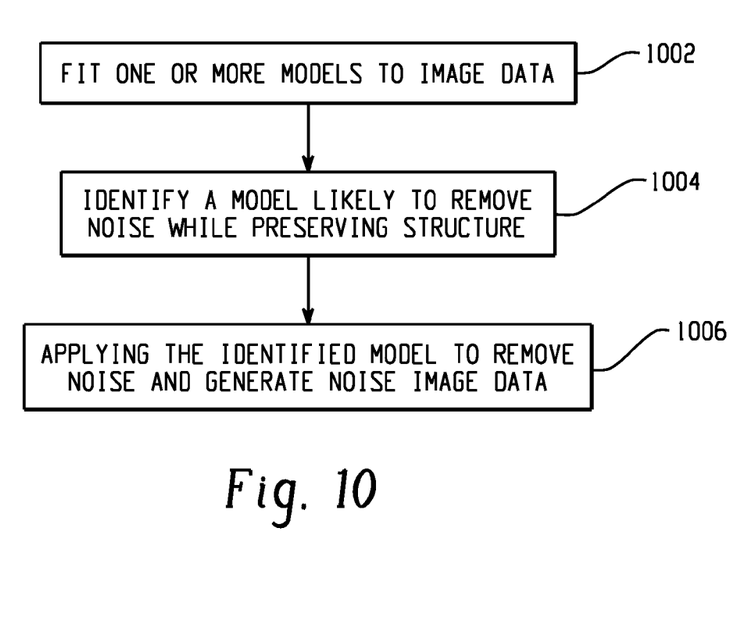

FIG. 10 illustrates a method for removing noise from image data and generating noise reduced image data.

At 1002, one or more models are fitted to the image data.

At 1004, one of the one or more models is identified likely to remove noise from the image data while preserving the structure representing the scanned object or subject in the image data.

At 1006, the identified model is applied to the image data to remove noise from the image data and generate the noise reduced image data.

Figure 11:
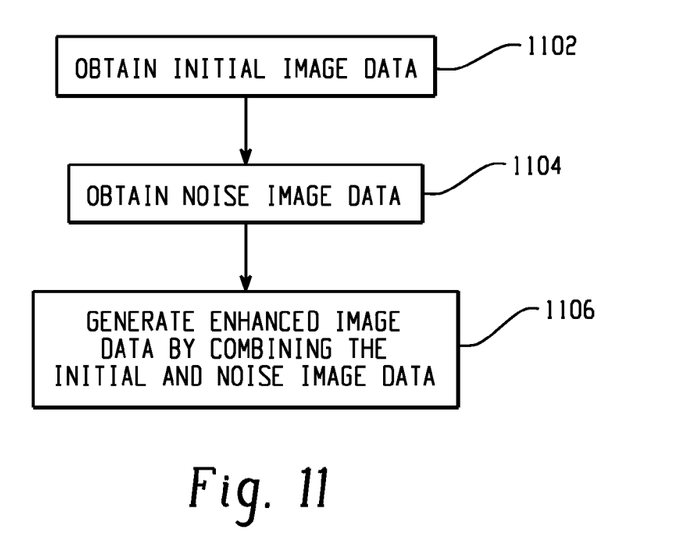

FIG. 11 illustrates a method for generating enhanced image data.

At 1102, the initial image data is obtained.

At 1104, the noise reduced image data is obtained.

At 1106, the enhanced image data is generated based on the initial image data and the noise reduced image data. As discussed herein, the percentage of each of the initial image data and the noise reduced image data contributing to the enhanced image data is based on predetermined IQ criteria.

The above may be implemented by way of computer readable instructions, which when executed by a computer processor(s), cause the processor(s) to carry out the described acts. In such a case, the instructions are stored in a computer readable storage medium associated with or otherwise accessible to the relevant computer.

The invention has been described herein with reference to the various embodiments. Modifications and alterations may occur to others upon reading the description herein. It is intended that the invention be construed as including all such modifications and alterations insofar as they come within the scope of the appended claims or the equivalents thereof.

What is claimed is:

1. A method, comprising:
    modeling a noise distribution based on image data by determining a noise standard deviation for sub-portions of voxels in the image data, wherein the sub-portions include outliers corresponding to non-homogeneous regions and inliers corresponding to homogenous regions;
    generating reduced noise image data based on the noise distribution by fitting various local structural models to the image data, selecting a model from the fitted models that is likely to remove noise from the image data while preserving the structure representing a scanned object or subject in the image data, and applying the selected model to the image data to remove noise; and
    generating enhanced image data based on the image data and the noise reduced image data by combining the image data and the noise reduced image data on a voxel-by-voxel basis based on a linear or non-linear mixing algorithm and predetermined image quality noise criteria, wherein an image quality of the enhanced image data is substantially similar to an image quality of higher dose image data.

2. The method of claim 1, further comprising: generating the enhanced image data based on noise reduced image data and the lower dose image data.

3. The method of claim 2, further comprising:
analyzing one or more data acquisition parameters used to scan an object or subject and generate the image data and identifying information from the one or more data acquisition parameters.

4. The method of claim 3, further comprising:
using the information when determining spatial kernel weights for noise removal.

5. The method of claim 4, the information comprising at least one of a minimum number of spatial weights and a central spatial weight for filtering kernel.

6. The method of claim 1, further comprising:
identifying the outliers in the image data based on a global algorithm and the noise standard.

7. The method of claim 6, wherein the global algorithm includes:
segmenting the scanned object or subject from the rest of the image data; and
analyzing the segmented data using a histogram of the local standard deviation of small regions of the scanned object or subject in which the histogram represents the distribution of the local standard deviation in the image data, wherein the local standard deviation on suspected outliers are identified using the histogram.

8. The method of claim 7, further comprising:
processing the inliers based on a smoothing algorithm, which is applied over local standard deviation image data.

9. The method of claim 8, wherein the predetermined image noise criteria is user adjustable.

10. The method of claim 1, further comprising: enhancing structural components in the image data.

11. The method of claim 1, wherein the enhanced image data is substantially invariant to a slice thickness of a data acquisition resulting in the image data.

12. The method of claim 1, wherein enhanced image data and the higher dose image data have a substantially similar noise variance.

13. A system, comprising:
a noise modeler that generates a noise distribution for image data by determining a noise standard deviation for sub-portions of voxels in the image data, wherein the sub-portions include outliers corresponding to non-homogeneous regions and inliers corresponding to homogenous regions;
a noise remover that removes noise from a lower dose image data based on the noise distribution by fitting various local structural models to the image data, selecting a model from the fitted models that is likely to remove noise from the image data while preserving the structure representing a scanned object or subject in the image data, and applying the selected model to the image data to remove noise, thereby generating noise reduced image data; and
an enhanced image generator that generates enhanced image data based on the lower dose image data and the noise reduced image data by combining the image data and the noise reduced image data on a voxel-by-voxel basis based on a linear or non-linear mixing algorithm and predetermined image quality noise criteria wherein an image quality of the enhanced image data is substantially similar to an image quality of higher dose image data.

14. The system of claim 13, wherein the noise distribution is a noise variance distribution determined from projection data used to generate the lower dose image data.

15. The system of claim 13, further comprising:
a structural enhancer that adaptively sharpens structural component in the image data based on a local Laplacian, a local noise level, and a parameter that controls an amount of aggressiveness and adaptation of the sharpening.

16. The system of claim 13, further comprising:
an acquisition parameter analyzer that determines information from one or more data acquisition parameters, which are used to generated enhanced image data, which is substantially invariant to a slice thickness of a data acquisition resulting in the image data.

17. The system of claim 16, wherein the information includes at least one of a minimum number of spatial weights or a central spatial weight for a filtering kernel.

18. The system of claim 17, wherein the weights facilitate balancing a relative influence of neighboring voxels in filtering kernel while keeping a size and a strength of a spatial component of the filtering kernel invariant to the slice thickness.

19. The system of claim 13, wherein the enhanced image data has a gradient magnitude that is substantially similar to a gradient magnitude corresponding to higher dose image data.

20. A method for modeling noise in image data, comprising:
determining, via a processor, a noise standard deviation for the image data;
determining, via the processor, a first set of outliers, which include edges corresponding to non-homogeneous regions, in the image data based on the noise standard deviation and a global algorithm by segmenting structures from the image data through thresholding and region growing, analyzing the segmented data using a histogram of a local standard deviation of small regions which histogram represents a distribution of the local standard deviation in the image data, and identifying the outliers as values past a fixed percentage of the distribution;
determining, via the processor, a set of inliers, which include non-edges corresponding to non-homogeneous regions, based on the set of outliers; and
determining, via the processor, a noise distribution based on the set of inliers, which are determined based on the first set of outliers.

21. The method of claim 20, further comprising:
determining a second set of outliers based on the set of inliers and a local algorithm; and
refining the noise distribution based on a second set of inliers, which are determined based on the second set of outliers.

* * * * *